United States Patent
Sohn et al.

(10) Patent No.: US 12,487,208 B2
(45) Date of Patent: Dec. 2, 2025

(54) METHOD FOR DETECTING FATIGUE CRACK IN STRUCTURE USING LONG SHORT-TERM MEMORY NETWORK-BASED SPECTRAL NOISE REDUCTION AND NONLINEAR ULTRASONIC MODULATION, AND SYSTEM THEREFOR

(71) Applicant: Korea Advanced Institute of Science and Technology, Daejeon (KR)

(72) Inventors: Hoon Sohn, Daejeon (KR); Jin Ho Jang, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 333 days.

(21) Appl. No.: 18/250,261

(22) PCT Filed: Dec. 31, 2021

(86) PCT No.: PCT/KR2021/020341
§ 371 (c)(1),
(2) Date: Apr. 24, 2023

(87) PCT Pub. No.: WO2022/146098
PCT Pub. Date: Jul. 7, 2022

(65) Prior Publication Data
US 2023/0384268 A1    Nov. 30, 2023

(30) Foreign Application Priority Data
Dec. 31, 2020   (KR) .................. 10-2020-0189448

(51) Int. Cl.
*G01N 29/46*    (2006.01)
*G01N 29/34*    (2006.01)
*G01N 29/36*    (2006.01)

(52) U.S. Cl.
CPC .............. *G01N 29/46* (2013.01); *G01N 29/34* (2013.01); *G01N 29/36* (2013.01)

(58) Field of Classification Search
CPC ........ G01N 29/46; G01N 29/34; G01N 29/36; G01N 29/043; G01N 29/44; G01N 29/341; G01N 29/4445
See application file for complete search history.

(56) References Cited

FOREIGN PATENT DOCUMENTS

| KR | 10-1693710 B1 | 1/2017 |
| KR | 10-1716877 B1 | 3/2017 |

(Continued)

OTHER PUBLICATIONS

International Search Report (with English Translation) dated Mar. 31, 2022 for International Application No. PCT/KR2021/020341; 5 Pages.

(Continued)

*Primary Examiner* — Tarun Sinha
(74) *Attorney, Agent, or Firm* — DALY, CROWLEY, MOFFORD & DURKEE, LLP

(57) ABSTRACT

A method for detecting fatigue cracks in a structure and a system therefore are disclosed. A vibration detection element detects vibration of the structure generated when the structure is excited at low and high frequencies and generates a measurement signal in the time domain. Based on a trained long short-term memory (LSTM) network, a signal of the next time step is predicted from the measurement signal of the current time step measured by the vibration detection element. The measurement signal and the prediction signal are combined to create a new combined signal with an increased length in the time domain. The combined signal is Fourier transformed to reduce noise and enhance the information of the measured signal in the frequency domain, and the Fourier transformed signal is used to obtain (Continued)

(A)

(B)

a spectral density function and to detect cracks in the structure.

20 Claims, 10 Drawing Sheets

(56) References Cited

FOREIGN PATENT DOCUMENTS

| KR | 10-1732494 B1 | 5/2017 |
|----|---------------|--------|
| KR | 2019-0090585 A | 8/2019 |
| KR | 2019-0106773 A | 9/2019 |
| KR | 10-2157903 B1 | 9/2020 |

OTHER PUBLICATIONS

Ruidong, "Research on Rail Detection Method Based on CNN and LSTM;" English Abstract; Dissertation for the Master Degree in Engineering at Harbin Institute of Technology; Jun. 2019; 76 Pages.
Chinese Office Action (with English Translation) dated Jul. 17, 2025 for Chinese Application No. 202180083951.8; 12 Pages.

(A)

(B)

(A)

(B)

(A) Architecture of LSTM Network (B) Architecture of Single Memory Cell Block

Ft:Forget Gate
It:Input Gate
Ot:Output Gate
S:Sigmoid Activation
T:tanh Activation

METHOD FOR DETECTING FATIGUE CRACK IN STRUCTURE USING LONG SHORT-TERM MEMORY NETWORK-BASED SPECTRAL NOISE REDUCTION AND NONLINEAR ULTRASONIC MODULATION, AND SYSTEM THEREFOR

CROSS-REFERENCE TO RELATED APPLICATION

This application is a U.S. National Stage Application of International application No. PCT/KR2021/020341 filed on Dec. 31, 2021 which is based upon and claims the benefit of priority to Korean Patent Application 10-2020-0189448, filed on Dec. 31, 2020 in the Korean Intellectual Property Office. The disclosures of the above-listed applications are hereby incorporated by reference herein in their entirety.

BACKGROUND

Technical Field

The present invention relates to the field of technology for detecting fatigue cracks in structures, and more particularly, to a method and a system for fatigue cracks in structure detection based on a long short-term memory (LSTM) network and nonlinear ultrasonic modulation technology.

Description Of Related Art

The fatigue crack in metal structures is a very critical issue in practice. This is because the fatigue crack is a major cause of failure that causes breakage of metal structures and components. In general, the fatigue crack often becomes noticeable only after the crack growth has reached about 80% of the overall fatigue life of the structure. To avert catastrophic failures, it is crucial to detect the fatigue crack at the early stage.

Various non-destructive evaluation (NDE) techniques and structural health monitoring (SHM) techniques are known, such as an ultrasonic method, a thermal imaging method, an acoustic emission method, a magnetic particle inspection method, an X-ray imaging method, and an eddy current method. Among them, the ultrasonic method is particularly effective for continuous on-line monitoring of fatigue cracks, making it one of the most promising approaches to the fatigue crack detection. Furthermore, this technique has proven effective in achieving a reasonable compromise between resolution, detectability and practicality.

The conventional linear ultrasonic method uses magnitude decay, phase delay, and change in mode conversion of linear ultrasonic waves transmitted through or reflected from fatigue cracks. However, since these changes in linear characteristics are noticeable only when the structural damage is severe, it is difficult for the conventional linear ultrasonic method to detect fatigue cracks that occur mainly in the early stage. Recent studies have shown that fatigue cracks are the source of nonlinear ultrasonic waves, and the sensitivity of nonlinear ultrasonic methods to fatigue cracks is much higher than that of conventional linear ultrasonic methods.

Nonlinear ultrasonic methods are promising, but the corresponding nonlinear response is quite weak, so the nonlinear characteristics are vulnerable to noises. Therefore, it is difficult to extract nonlinear characteristics in noisy conditions using the spectral density function. In particular, this is because noises overlap with nonlinear characteristics in the spectral domain. Therefore, reducing spectral noise is important and has great advantages in improving fatigue crack detection performance based on nonlinear characteristics.

A spectral subtraction method has been used to reduce the spectral noise. The method is to reconstruct the power spectrum of the observed signal from the additive noise by subtracting an estimation value of average noise spectrum from the noisy signal spectrum. The noise spectrum is usually estimated and updated in the absence of a signal. However, due to random variations in the noise, spectrum subtraction can result in a negative estimate of the power spectrum. In addition, this method is not suitable for ultrasonic signals because there is no signal-free period in ultrasonic signals.

Zero padding is a widely used method for spectral noise reduction. The zero padding is a way to add samples of zeros. However, since the signal extrapolated with zeros cannot retain the information of the signal, the nonlinear characteristics of the signal are also lost.

SUMMARY

Technical Object

An object of the present invention is to provide a method that can improve the performance of detecting fatigue cracks in a structure by using the data reduction effect without damage of the spectral density and amplitude of the existing nonlinear ultrasonic modulation components, while reducing the spectral noise using the predictive characteristics of the LSTM network for the ultrasonic signal.

Another object of the present invention is to provide a system capable of carrying out the above method.

The problem to be solved by the present invention is not limited to the above problems, and can be expanded in various ways without departing from the spirit and scope of the present invention.

Technical Solution

A method for detecting a fatigue crack in a structure according to embodiments for achieving the object of the present invention includes: training an LSTM network using ultrasonic measurement signals measured from structures simultaneously excited by two ultrasonic signals with two distinguishable frequencies, respectively, to acquire a prediction model for time-domain signals, in a response signal processing unit; inputting a ultrasonic measurement signal at a current time step measured from a target structure that simultaneously excited by a first ultrasonic signal of a first frequency $\omega_a$ and a second ultrasonic signal of a second frequency $\omega_b$, wherein $\omega_a < \omega_b$, into a trained LSTM network to obtain an ultrasonic prediction signal at a next time step, depending on a number of data points set, in the response signal processing unit; reconstructing a signal using the obtained ultrasonic prediction signal, in the response signal processing unit; Fourier transforming the reconstructed signal in the response signal processing unit; and determining whether a crack has occurred in the target structure by detecting a nonlinear modulation component based on a value of a spectrum density function obtained using the Fourier transformed signal, in the response signal processing unit.

In an exemplary embodiment, the method for detecting the fatigue crack in the structure may include calculating a damage index by substituting the spectral density function into a nonlinear modulation parameter equation in the response signal processing unit; and detecting a fatigue crack of the structure using the calculated damage index.

In an exemplary embodiment, the spectrum density function $P_{x_N}(\omega)$ may be calculated using equation $P_{x_N}(\omega)=E[X_N(\omega)X_N^*(\omega)]$, where $X_N(\omega)$ represents the Fourier transformed signal of the reconstructed ultrasonic signal $x_N(t)$, * denotes a complex conjugate, and E[ ] represents an expectation operator. Furthermore, the damage index $\beta_{D_N}$ may be obtained using an equation of $$\beta_{D_N} \approx \frac{E[X_N(\omega_{\omega_a+\omega_b})X_N^*(\omega_{\omega_a+\omega_b})] + E[X_N(\omega_{\omega_a-\omega_b})X_N^*(\omega_{\omega_a-\omega_b})]}{E[X_N(\omega_a)X_N^*(\omega_a)]E[X_N(\omega_b)X_N^*(\omega_b)]}.$$

In an exemplary embodiment, the method for detecting a fatigue crack in the structure may further include: simultaneously exciting the target structure by generating the first and second ultrasonic signals by an exciting unit and applying them to first and second excitation elements attached to the target structure, respectively; and detecting vibration of the target structure according to excitation of the first and second ultrasonic signals with a vibration detection element attached to the target structure, and providing a corresponding ultrasonic measurement signal to the response signal processing unit.

In an exemplary embodiment, the prediction model of the trained LSTM network may be designed and trained to predict an ultrasonic signal at the next time step by learning the nonlinear modulation frequency components, which are fatigue crack-induced patterns over the entire time series data of the ultrasonic measurement signal, in a way of updating a previous cell state to a new cell state by partially adding new information provided by an input gate while forgetting some of the previous cell state information.

In an exemplary embodiment, the reconstructed signal may be a signal reconstructed with only ultrasonic prediction signals at the next time step.

In an exemplary embodiment, the number of data points of the reconstructed signal is determined by multiplying the number of data points of the ultrasonic measurement signal by a data reduction rate α of a predetermined size, and the data reduction rate α may be determined within a range from 0 and 1.

In an exemplary embodiment, the reconstructed signal may be a signal reconstructed by combining the ultrasonic measurement signal at the current time step and the ultrasonic prediction signal at the next time step.

In an exemplary embodiment, the Fourier transformed signal of the reconstructed signal may be a signal in a frequency domain in which noise is reduced and information of the ultrasonic measurement signal is enhanced.

In another aspect of the present invention, exemplary embodiments provide a system for detecting fatigue cracks in a structure that includes a first excitation element, a second excitation element, an exciting unit, a vibration detection element, and a response signal processing unit. The first excitation element is attached to a first region of a target structure and is configured to excite the target structure by being vibrated when a first ultrasonic signal of a first frequency $\omega_a$ is input. The second excitation element is attached to the first region of the target structure and is configured to excite the target structure by being vibrated as a second ultrasonic signal of a second frequency $\omega_b$ is input, where $\omega_a<\omega_b$. The exciting unit is configured to generate the first ultrasonic signal and the second ultrasonic signal and simultaneously provide them to the first and second excitation elements, respectively. The vibration detection element is attached to a second region of the target structure spaced apart from the first region, and is configured to detect vibration of the target structure according to excitation by the first and second ultrasonic signals to generate a corresponding ultrasonic measurement signal. The response signal processing unit includes an operation processing unit configured to perform the functions of: training an LSTM network using ultrasonic measurement signals measured from structures simultaneously excited by two ultrasonic signals with two distinguishable frequencies, respectively, to acquire a prediction model for time-domain signals; inputting an ultrasonic measurement signal at a current time step measured from a target structure that simultaneously excited by a first ultrasonic signal of a first frequency $\omega_a$ and a second ultrasonic signal of a second frequency $\omega_b$, wherein $\omega_a<\omega_b$, into a trained LSTM network to obtain an ultrasonic prediction signal at a next time step, depending on a number of data points set; reconstructing a signal using the obtained ultrasonic prediction signal; Fourier transforming the reconstructed signal in the response signal processing unit; and determining whether a crack has occurred in the target structure by detecting a nonlinear modulation component based on a value of a spectrum density function obtained using the Fourier transformed signal.

In an exemplary embodiment, the operation processing unit of the response signal processing unit may be configured to further perform the functions of calculating a damage index by substituting the spectral density function into a nonlinear modulation parameter equation; and detecting the fatigue crack of the structure using the calculated damage index.

In an exemplary embodiment, the response signal processing unit may further include a digitizing unit that converts an analog measurement signal measured by the vibration detection element into a digital measurement signal and provides the converted digital measurement signal to the operation processing unit.

In an exemplary embodiment, the first and second excitation elements and the vibration detection element may be comprised of piezoelectric elements.

In an exemplary embodiment, the prediction model of the trained LSTM network may be designed and trained to predict an ultrasonic signal at the next time step by learning the nonlinear modulation frequency components, which are fatigue crack-induced patterns over the entire time series data of the ultrasonic measurement signal, in a way of updating a previous cell state to a new cell state by partially adding new information provided by an input gate while forgetting some of the previous cell state information.

In an exemplary embodiment, the reconstructed signal may be a signal reconstructed with only ultrasonic prediction signals at the next time step.

In an exemplary embodiment, the number of data points of the reconstructed signal may be determined by multiplying the number of data points of the ultrasonic measurement signal by a data reduction rate α of a predetermined size, and the data reduction rate α may be determined within a range from 0 and 1.

In an exemplary embodiment, the reconstructed signal may be a signal reconstructed by combining the ultrasonic measurement signal at the current time step and the ultrasonic prediction signal at the next time step.

Effect Of Invention

According to exemplary embodiments of the present invention, used is an LSTM network which is designed and trained to predict the ultrasonic signal of the next time step through learning the nonlinear modulation frequency components, which are patterns caused by fatigue cracks, over the entire time series data of the measured ultrasonic signal. In the signal reconstructed through the trained LSTM, the nonlinear modulation component required for fatigue crack detection is maintained and amplified at the original level, and the noise component is reduced. That is, use of the trained LSTM network can greatly increase the signal-to-noise ratio (SNR) (up to 276%), thereby effectively improving the fatigue crack detection performance.

In addition, the trained LSTM network can generate a reconstructed signal using far fewer data points than the measured signal without reducing the modulation amplitude. In this way, the amount of data to be processed can be reduced. The trained LSTM network can generate a reconstructed ultrasonic signal using only 20% of the original data. At this time, the nonlinear modulation amplitude obtained from the reconstructed signal is equal to the modulation amplitude of the original signal, so that the performance of fatigue crack detection does not deteriorate despite the data amount reduction.

DETAILED DESCRIPTION OF THE EMBODIMENTS

Figure 1:
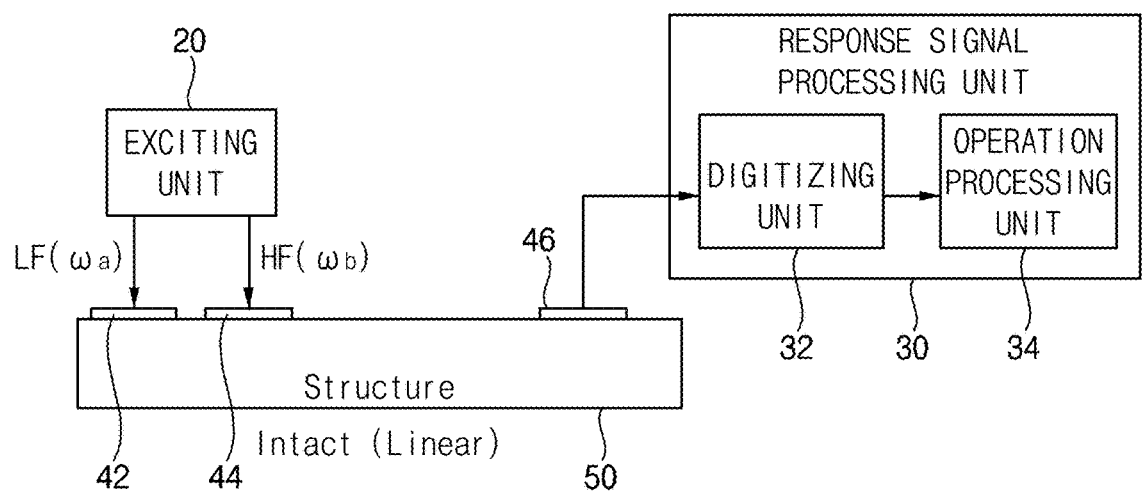
FIG. 1 (A) illustrates performing ultrasonic measurement of an intact structure using an ultrasonic modulation-based crack detection system according to an exemplary embodiment of the present invention, and (B) represents a frequency response characteristic measured from the intact structure.
Figure 1:
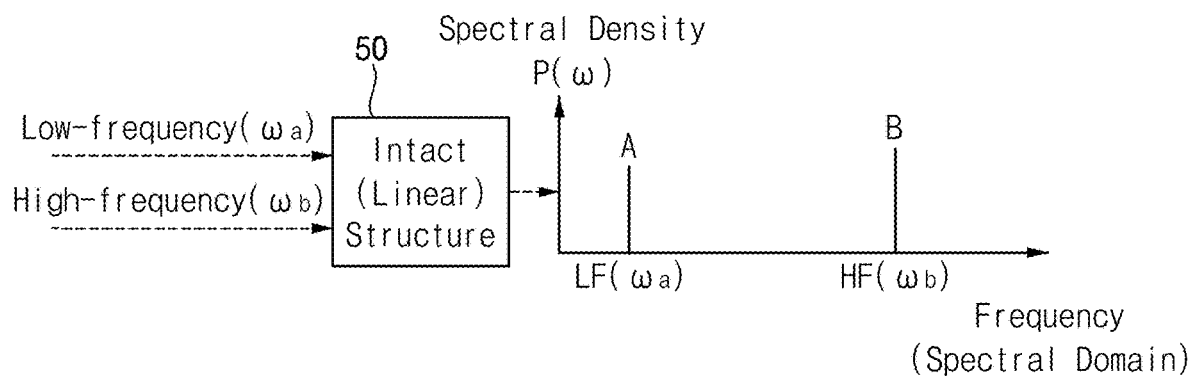

Hereinafter, with reference to the accompanying drawings, preferred embodiments of the present invention will be described in more detail. The same reference numerals will be used for the same elements in the drawings, and redundant descriptions of the same elements will be omitted.

Figure 2:
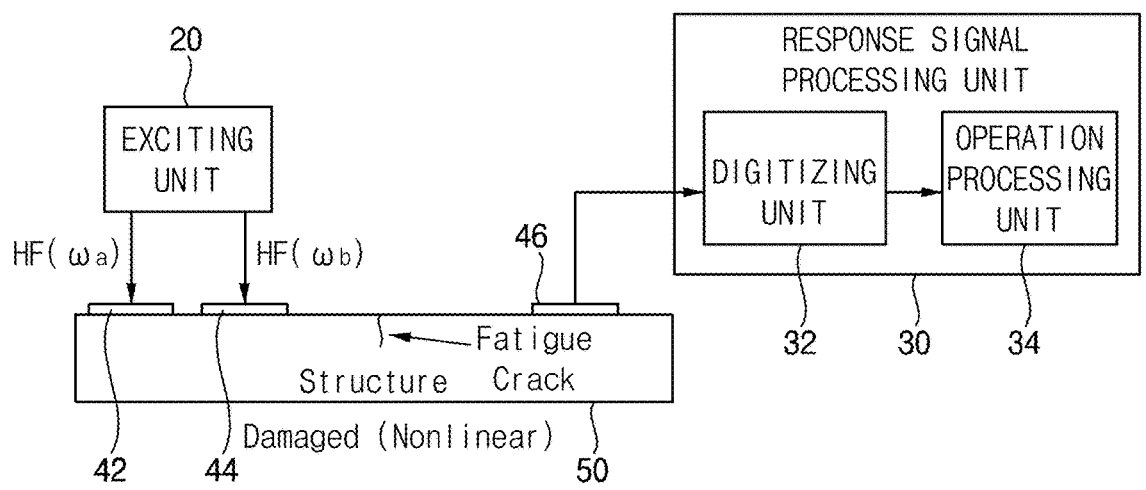
FIG. 2 (A) illustrates performing nonlinear ultrasonic measurement of a damaged structure with cracks using the ultrasonic modulation-based crack detection system of FIG. 1, and (B) shows a frequency response characteristic measured from the damaged structure.
Figure 2:
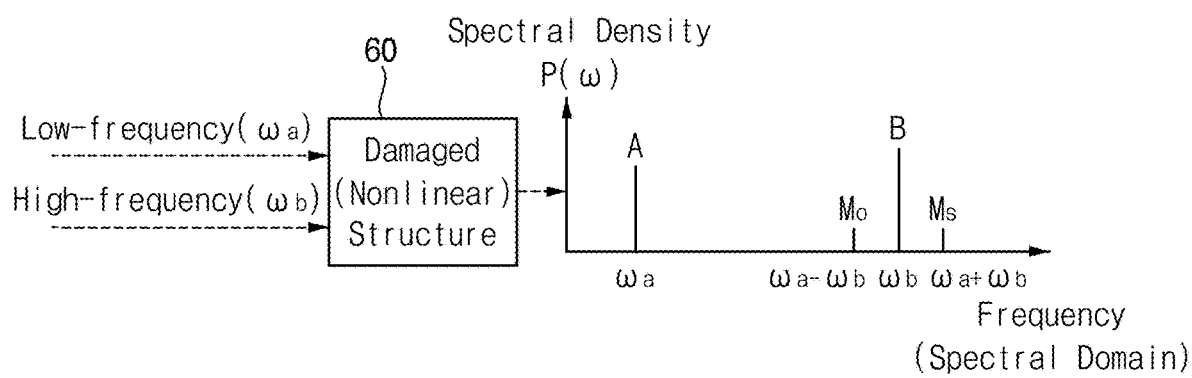

FIG. 1 (A) illustrates ultrasonic measurement on an intact structure 50 using an ultrasonic-based crack detection system 10 according to an exemplary embodiment of the present invention, and (B) illustrates the frequency response characteristics measured from the structure 50. FIG. 2 (A) illustrates nonlinear ultrasonic measurement of a damaged structure 60 with a crack using the ultrasonic-based crack detection system 10 shown in FIG. 1, and (B) shows the frequency response characteristics measured from the damaged structure 60.

As shown in FIG. 1, the ultrasonic-based crack detection system 10 may include an exciting unit 20, a response signal processing unit 30, first and second excitation elements 42 and 44, and a vibration detection element 46.

The exciting unit 20 may be configured to generate and provide excitation signals to excite the structure 50 by vibrating the first and second excitation elements 42 and 44. In one embodiment, the exciting unit 20 may include a waveform generator capable of generating an arbitrary periodic waveform having a predetermined frequency. The exciting unit 20 may generate a low-frequency ultrasonic signal $LF(\omega_a)$ and a high-frequency ultrasonic signal $HF(\omega_b)$ as the excitation signals and provide them to the first and second excitation elements 42 and 44, respectively.

The first and second excitation elements 42 and 44 may be attached in close proximity to each other in a first region of the intact structure 50, and the vibration detection element 46 may be attached to a second region of the structure 50. The first region and the second region may be located at opposite ends of a target region for crack detection. The exciting unit 20 is connected to the first and second excitation elements 42 and 44.

In an exemplary embodiment, the first and second excitation elements 42 and 44 may be composed of, for example, piezoelectric elements. When the exciting unit 20 simultaneously inputs the low-frequency ultrasonic signal $LF(\omega_a)$ and the high-frequency ultrasonic signal $HF(\omega_b)$ to the first and second excitation elements 42 and 44, respectively, the first and second excitation elements 42 and 44 can excite the structure 50 by vibrating at a low frequency $\omega_a$ and a high frequency $\omega_b$, respectively. As a result, the structure 50 makes ultrasonic vibrations at the low frequency $\omega_a$ and high frequency $\omega_b$.

In an exemplary embodiment, the vibration detection element 46 may also be composed of, for example, a piezoelectric element. While the structure 50 vibrates by the excitation of the first and second excitation elements 42 and 44, the vibration can be transmitted to the vibration detection device 46. The vibration detection element 46 may detect the vibration of the structure 50 and generate electrical signals corresponding thereto. For example, the vibration detection element 46 may detect the vibration of the structure 50 and output low frequency and high frequency analog signals.

The amplitudes of the two analog response signals may be set to a peak-to-peak voltage of, for example, 16V.

In an exemplary embodiment, the response signal processing unit 30 may be connected to the vibration detection element 46. The response signal processing unit 30 may be configured to produce information about the occurrence of cracks in the structure 50 by receiving an analog response signal corresponding to the vibration of the structure 50 detected by the vibration detection element 46 and performing specific processing to obtain the frequency response of the structure 50. In an exemplary embodiment, the response signal processing unit 30 may be configured to produce a damage index of the structure 50 by processing the analog response signal corresponding to the vibration detected by the vibration detection element 46.

In an exemplary embodiment, the response signal processing unit 30 may include a digitizing unit 32 that converts the output analog signal from the vibration detection element 46 into a digital signal, and an operation processing unit 34 that receives the converted digital signal and performs specific operations to obtain the frequency response, damage index, etc. of the structure 50. The digitizing unit 32 may perform the conversion at a sampling rate of, for example, 1 MHz for 0.1 second. The response signal processing unit 30 may be implemented using a hardware component, a software component, and/or a combination of hardware and software components.

The operation processing unit 34 may be implemented as a computer program and a computing device capable of executing the computer program and performing a predetermined task indicated by the computer program or providing a function. The operation processing unit 34 may be the computing device configured to be trained to predict a measurement signal at the next time step through LSTM network-based learning by executing a computer program to be described later, to convert a signal in the time domain into a signal in the frequency domain, and to calculate a damage index by executing a computer program implementing a spectral noise reduction algorithm to be described later. The computing device may be implemented using, for example, a processor, controller, arithmetic logic unit (ALU), digital signal processor, microcomputer, field programmable array (FPA), programmable logic unit (PLU), microprocessor, or one or more general purpose or special purpose computers, like any other device capable of executing and responding to instructions. The computing device may also include computing resources such as memory, data storage, input/output unit, and other computing resources.

The computer program implemented to perform the functions of the response signal processing unit 30, including an LSTM network model and its learning data, etc. may be stored in one or more computer-readable recording media. The method according to an exemplary embodiment of the present invention may be implemented in the form of program commands that can be executed through various computer means and recorded on the computer-readable media. The computer-readable recording media may include program commands, data files, data structures, etc. alone or in combination. The program commands recorded on the recording media may be specially designed and configured for the exemplary embodiment or may be known and made available to those skilled in computer software.

In the ultrasonic-based crack detection system 10 having such a configuration, the exciting unit 20 may apply two ultrasonic signals of two distinct frequencies, for example, a low frequency $\omega_a$ and a high frequency $\omega_b$ (where $\omega_a<\omega_b$) to the first and second excitation elements 42 and 44 respectively to excite simultaneously the intact structure 50. As a result, the intact structure 50 vibrates, and at the same time, a response corresponding to the vibration of the structure 50 can be measured using the vibration detection element 46. The signal of the vibration of the structure 50 measured by the vibration detection element 46 may be an analog signal in the time domain. The response signal processing unit 30 processes the analog measurement signal received from the vibration detection element 46 to observe the responses A, and B only at the two frequencies $\omega_a$ and $\omega_b$ of the input signal that excites the structure 50, as seen in the spectral domain. In other words, when the ultrasonic input signals $LF(\omega_a)$ and $HF(\omega_b)$ of two distinct frequencies $\omega_a$ and $\omega_b$, where $\omega_a<\omega_b$, are inputted to the intact structure 50 at the same time, the frequency responses A and B due to the vibration of the undamaged structure 50 are observed only at the two input frequencies $\omega_a$ and $\omega_b$ (see FIG. 1 (B)).

However, when the two ultrasonic input signals $LF(\omega_a)$ and $HF(\omega_b)$ are applied to the (nonlinear) structure 60 with damage such as cracks, unlike the above, a nonlinear ultrasonic modulation is induced by a crack opening and closing mechanism. Referring to FIG. 2, as in the case of FIG. 1, the exciting unit 20 applies two ultrasonic excitation signals $LF(\omega_a)$ and $HF(\omega_b)$ of low frequency $\omega_a$ and high frequency $\omega_b$, respectively, to the first and second excitation elements 42 and 44 at the same time to excite the damaged (nonlinear) structure 60. At the same time, if the vibration response of the damaged structure 60 is measured through the vibration detection element 46, an analog response signal in the time domain, as shown in (B) of FIG. 2, can be obtained. By transforming the analog response signal into the frequency domain, the response in the spectral domain can be examined, which differs from that of the intact structure 50. When the structure 60 operates nonlinearly due to cracks, the responses from the structure 60 in the spectral domain may include not only the response components A and B at the two input frequencies $\omega_a$ and $\omega_b$ but also the modulation components $M_o$ and $M_s$ at the sum frequency ($\omega_b+\omega_a$) and the difference frequency ($\omega_b-\omega_a$), respectively, which are the modulation frequencies of the input frequencies. That is, the amplitude of the high frequency ultrasonic input signal is modulated by the crack opening and closing mechanism due to the low frequency ultrasonic input signal. Amplitude modulation creates an additional frequency component (nonlinear modulation component) at the sum and difference frequencies ($\omega_a \pm \omega_b$) of the input frequencies. This phenomenon is called 'nonlinear ultrasonic modulation.' Since this phenomenon occurs only when there are nonlinear features present, it can be considered as an index of damage in the structure. Therefore, the presence of fatigue cracks can be identified by finding and extracting modulation components in the frequency spectral domain.

However, the amplitude of the nonlinear ultrasonic modulation component induced by the nonlinearity of the structure is generally small ($M_O$, $M_S$), making it difficult to distinguish from noise. In order to solve this problem, which is very susceptible to noise, signal processing is required to attenuate noise and distinguish the modulation frequency response, that is, the amplitude of the modulation component, from the noise. To this end, an exemplary embodiment of the present invention proposes a method for effectively detecting damage to a structure by using the LSTM network and Fourier transform to reduce spectral noise. Hereinafter, this will be described in detail.

LSTM networks are effectively used for forecasting sequential data such as time-domain signals. LSTM networks are a special type of recurrent neural network (RNN)

architecture that can be applied to sequential data. However, conventional RNNs often have difficulty learning long-term dependencies of time-sequential data due to the exploding- and vanishing-gradient problems during training. To overcome this problem, LSTM networks have been developed. LSTM networks use memory cell blocks that can represent long-term dependencies in time-series data. Specifically, LSTM networks can control how much to remember (reflect) data from the distant past by adding a cell state gate (C) to the existing RNN.

Figure 3:
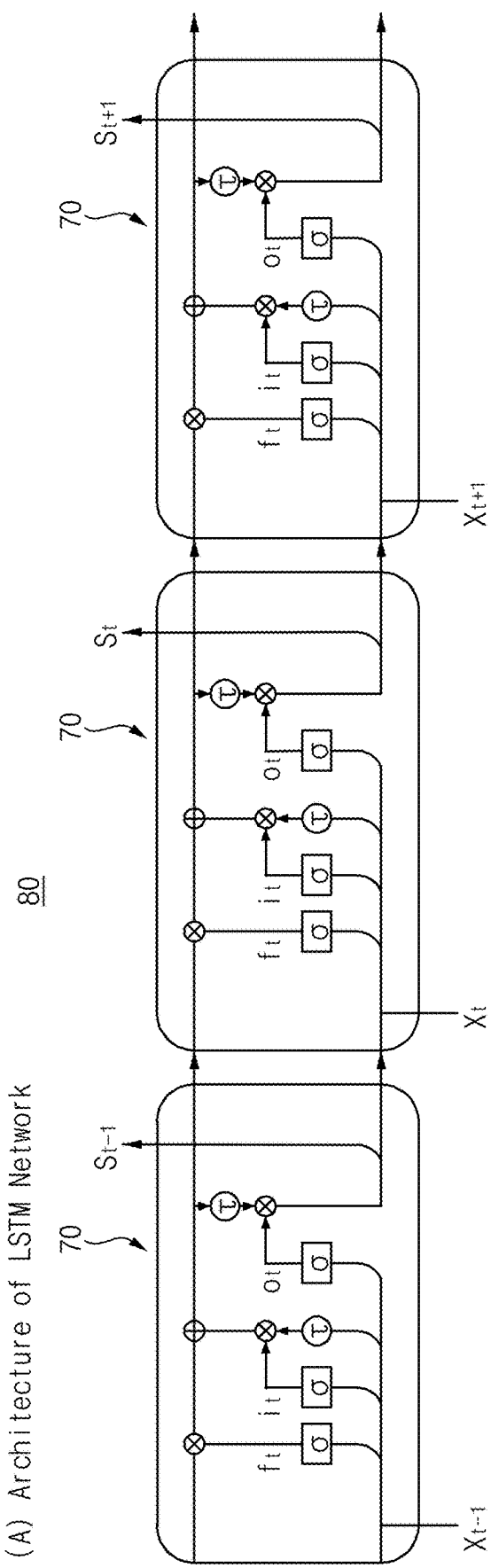
FIG. 3 schematically illustrates (A) a structure of an LSTM network and (B) a structure of a memory cell used for the fatigue crack detection method according to an exemplary embodiment of the present invention.
Figure 3:
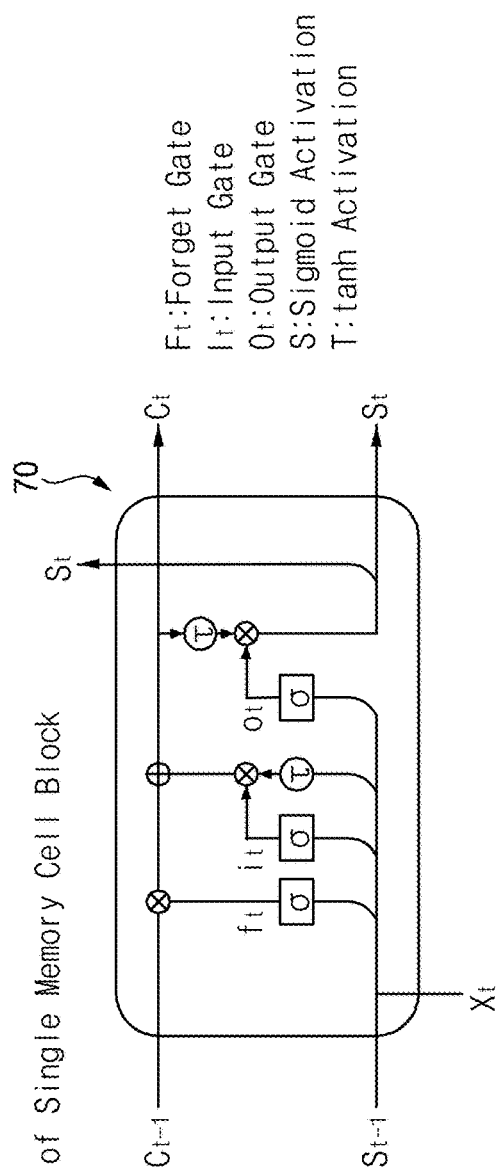

FIGS. 3 (A) and (B) schematically show the architectures of an LSTM network and memory cells used in the method of detecting fatigue cracks according to an exemplary embodiment of the present invention, respectively.

Referring to FIG. 3(A), the LSTM network 80 has an architecture in which blocks of a plurality of memory cells 70 are sequentially connected. Each memory cell 70 may include an input gate $i_t$, an output gate $o_t$, a forget gate $f_t$, and a self-recurrent neuron. These gates $i_t$, $o_t$, and $f_t$ control interactions with adjacent memory cells. The LSTM network may include an input layer, a fully-connected hidden layer, and an output layer. The hidden layer includes memory cells, associated gate units, and hidden units, which provides inputs to gate units and memory cells. The input gate $i_t$ may control whether an input signal can modify the state of the memory cell 70. On the other hand, the output gate $o_t$ may control whether the state of other memory cell 70 can be modified. The forget gate $f_t$ may decide to forget or remember the previous state. That is, the extent to which the previous memory cell state $C_{t-1}$ may be reflected is controlled by the forget gate $f_t$. The computations in the LSTM memory cell block can be expressed as follows:

$$f_t = \sigma(X_t U^f + S_{t-1} W^f + b_f) \quad (1)$$

$$i_t = \sigma(X_t U^i + S_{t-1} W^i + b_i) \quad (2)$$

$$\tilde{C}_t = \tau(X_t U^c + S_{t-1} W^c + b_c) \quad (3)$$

$$C_t = C_{t-1} \otimes f_t \oplus i_t \otimes \tilde{C}_t \quad (4)$$

$$O_t = \sigma(X_t U^o + S_{t-1} W^o + b_o) \quad (5)$$

$$S_t = O_t \otimes \tau(C_t) \quad (6)$$

Here, $U(U_f, U_i, U_o, U_c)$, $b(b_f, b_i, b_o, b_c)$, and $W(W^f, W^i, W^o, W^c)$ are the weights of the input, bias, and recurrent weight, respectively. The superscripts f, i, o, and c represent the forget gate, input gate, output gate, and self-recurrent neuron, respectively. $X_t$ is the sequential input data at the $t^{th}$ time step. $S_t$, $C_t$, $\tilde{C}_t$, $\sigma$, and $\tau$ are the hidden state, cell state, new candidate value of the cell state, sigmoid activation function, and hyperbolic tangent (tanh) activation function, respectively. Finally, $\otimes$ and $\oplus$ are pointwise multiplication and addition operators, respectively.

The first step of the LSTM network 80 is to choose which information to be thrown away from the cell state. This decision is made by the forget gate $f_t$ in Equation (1). The second step is to select new information to be stored in the cell state. The input gate in Equation (2) determines which input values to be updated. The hyperbolic tangent (tanh) activation function, $\tau$, sequentially creates a new candidate value $\tilde{C}_t$ that could be added to the cell state in Equation (3). The third step is to update the old cell state $C_{t-1}$ into the new cell state $C_t$ by forgetting some portion of the previous cell state information (forgetting the information decided to forget at the previous time step) and partially adding new information provided from the input gate. To this end, as in Equation (4), the value $C_{t-1} \otimes f_t$ obtained by pointwise multiplying the previous cell state $C_{t-1}$ by $f_t$ and the value $i_t \otimes \tilde{C}_t$ obtained by pointwise multiplying the new candidate value $\tilde{C}_t$ by the input gate information $i_t$ are added. Finally, the hidden cell state is updated using the output gate $O_t$, and the updated cell state $C_t$ as shown in Equations (5) and (6).

A key feature of the LSTM network 80 is the cell state $C_t$, which horizontally passes through the top of the memory cell block 70 and linearly interacts with the gates, as shown in FIG. 3. The LSTM network 80 can remove past information or add new information to the cell state through the gates. The gates offer a way to pass information through the cell state selectively. For instance, a sigmoid activation function a used in a gate in the memory cell 70 controls the amount of information passing through the sigmoid function by varying its output value between 0 and 1. If the output value is 0, it means that no information is passed. If it is 1, it means that all information is passed.

The spectral noise and data reduction technique according to exemplary embodiment may use the signal forecasting (reconstruction) characteristic of the LSTM network. The LSTM network has advantages in learning long-term patterns in data. The ultrasonic signal may be treated as long-term time-series data because many data points in the time domain are obtained at a high sampling frequency. Considering this point, an LSTM network may be constructed and trained to learn fatigue crack-induced patterns (nonlinear modulation frequency components) in the measured ultrasonic signals. Here, fatigue crack-induced patterns may be extracted along the whole time-series data. However, the noise components have a random distribution in the data, and the LSTM network does not learn the noise components. Therefore, the noise components can be eliminated using the LSTM network, and the reconstructed signal retains only meaningful components such as fatigue crack-induced nonlinear modulation components. As a result, the amplitudes of the nonlinear modulation components may be amplified, and the noise floor level may be lowered in the spectral domain.

The Fourier transform transforms data from the time domain to the frequency domain. That is, Fourier transform may be used to analyze the measured time domain signal x(t) in the frequency domain.

The spectral coefficient of the measurement signal x(t) is given by $$a_k = \frac{1}{T} \int_T x(t) e^{-jk\omega_0 t} dt = \frac{1}{T} \int_T x(t) e^{-jk\left(\frac{2\pi}{T}\right)t} dt \quad (7)$$

The coefficient a(0) is a constant component of x(t) and is calculated by Equation (7) when k=0.

$$a_0 = \frac{1}{T} \int_T x(t) dt \quad (8)$$

Here, it is simply an average value of x(t) over a period. The Fourier transform is derived by the spectral coefficients representing the weighted values of specific frequencies for a signal when expressed as a Fourier series, and the formula of the Fourier transform is given as follows.

$$X(\omega) = \int_{-\infty}^{\infty} x(t) e^{-j\omega t} dt \quad (9)$$

The Fourier transform represents the information needed for describing the measurement signal x(t) as a linear combination of sinusoidal signals at different frequencies.

That is, the signal length T is related to averaging when transforming x(t) into X(ω) through the Fourier transform as shown in Equation (7-9). Therefore, if the length T of the measurement signal x(t) can be extended while retaining the information of the measurement signal x(t), the spectral noise of the signal X(ω) in the frequency domain obtained by performing the Fourier transform can be reduced through the effect of noise averaging.

More specifically, as the length of a signal in the time domain increases, the Fourier transform signal of the signal provides an effect of increasing the number of averaging times. Since the noises are randomly distributed, as the number of averaging times increases, the noise decreases. In view of this, in order to increase the signal length in the time domain, a signal of a next time interval of a measurement signal of a current time interval may be predicted in the time domain by using the LSTM network 80' trained through learning of a large amount of training data. In constructing the LSTM network model, the noise is not learned, but the information included in the measurement signal is learned. Therefore, noise is not reflected in the signal predicted by using the LSTM network, but only the learned information is reflected. If the measurement signal and the prediction signal are combined into a new signal in the time domain and Fourier transform is performed with the new signal, as the number of averaging increases, the noise is reduced, but the information included in the signal can be strengthened. Information on the crack can be also enriched. While the noise is reduced, the crack information included in the signal is enhanced, so the SNR can be increased and the crack detection ability can be improved.

The spectral density function (power function) may be calculated to extract the modulation component and is given as follows.

$$P_x(\omega) = E[X(\omega)X^*(\omega)] \quad (10)$$

Here, * represents the complex conjugate, and E[ ] represents an expectation operator. In an exemplary embodiment, the first order modulations at the sum and difference frequencies, $\omega_a \pm \omega_b$, are considered for damage index. The nonlinear modulation parameter, $\beta_D$, may be defined as follows.

$$\beta_D \approx \frac{4[P_x(\omega_a+\omega_b)+P_x(\omega_a+\omega_b)]}{P_x(\omega_a)P_x(\omega_b)k_a k_b} \propto \frac{P_x(\omega_a+\omega_b)+P_x(\omega_a+\omega_b)}{P_x(\omega_a)P_x(\omega_b)} \quad (11)$$

Here, $k_a$ and $k_b$ are the corresponding wavenumbers, respectively. Substituting Equation (10) into Equation (11), the following equation is obtained as follows.

$$\beta_D \approx \frac{E[X(\omega_a+\omega_b)X^*(\omega_a+\omega_b)]+E[X(\omega_a-\omega_b)X^*(\omega_a-\omega_b)]}{E[X(\omega_a)X^*(\omega_a)]E[X(\omega_b X^*(\omega_b)]} \quad (12)$$

This nonlinear modulation parameter $\beta_D$ may be used as a damage index because of its sensitivity to fatigue crack.

As explained above, the spectral noise reduction is developed using the LSTM network and Fourier transform. The LSTM network may be trained to predict the signal x'(t) of the next time step of the measured signal of the current time step by learning the signal x(t) measured at the current time step. Through the training, a model of the LSTM network capable of predicting the signal of the next time step can be obtained. The signal length T of the signal x(t) measured by the LSTM network may be extended with the information of the signal retained. Therefore, the spectral noise is reduced when conducting the Fourier transform based on the effect of noise averaging. In contrast, since the characteristics of the signal, that is, signal information, are learned by the trained LSTM network and reflected in the signals of forecasted time steps, the signal information is not reduced even if Fourier transform is performed. Accordingly, the signal-to-noise ratio (SNR) can be improved due to the relationship between the signal length in the time domain and the spectrum signal.

Figure 4:
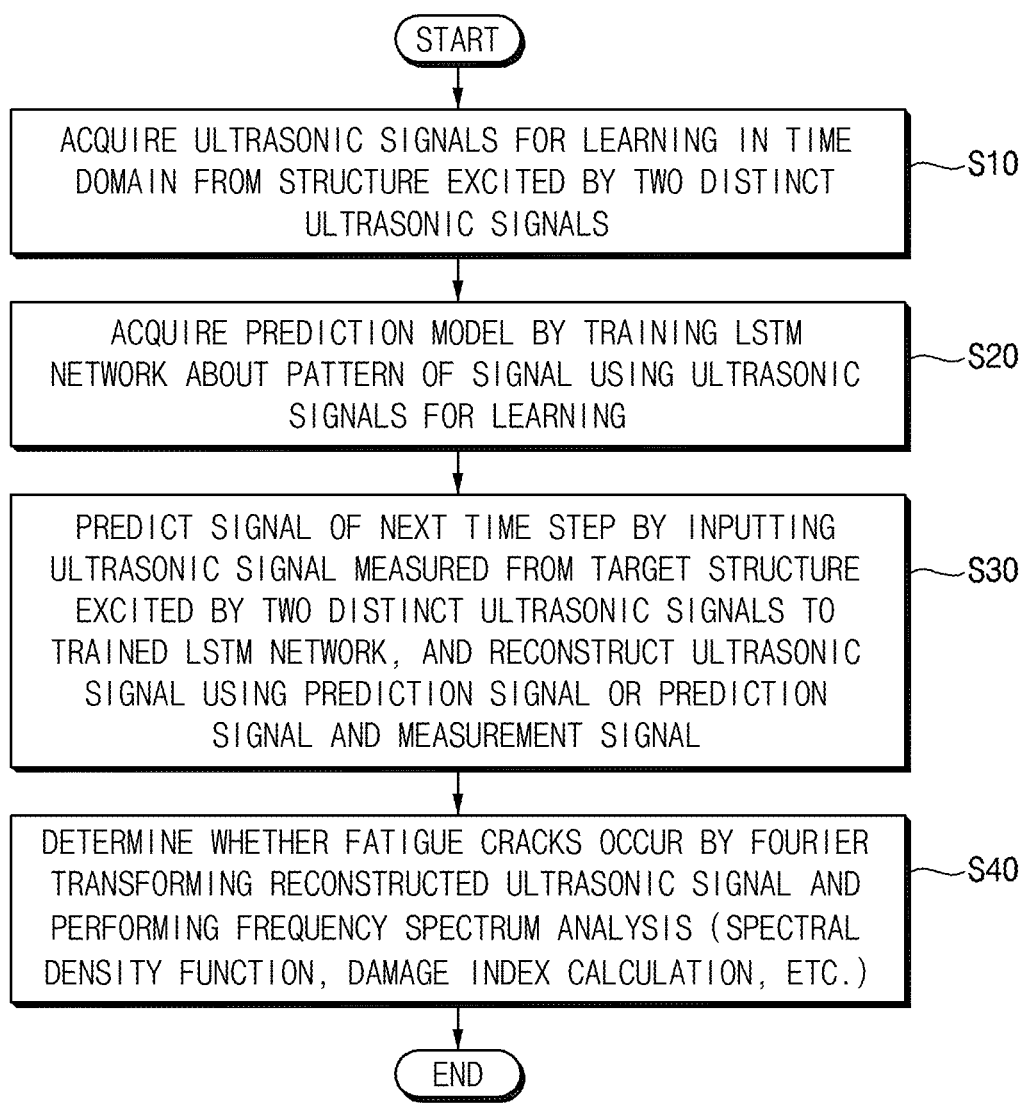
FIG. 4 is a flow chart schematically illustrating a spectral noise and data reduction algorithm for fatigue crack detection in structures according to an exemplary embodiment of the present invention.

Based on this concept, it is possible to reduce spectral noise and data for fatigue crack detection of structures. The flow chart of FIG. 4 schematically illustrates a spectral noise and data reduction algorithm for detecting fatigue cracks in a structure according to an exemplary embodiment of the present invention. The ultrasonic-based spectral noise and data reduction technique for nonlinear fatigue crack detection may use the LSTM network 80.

Figure 5:
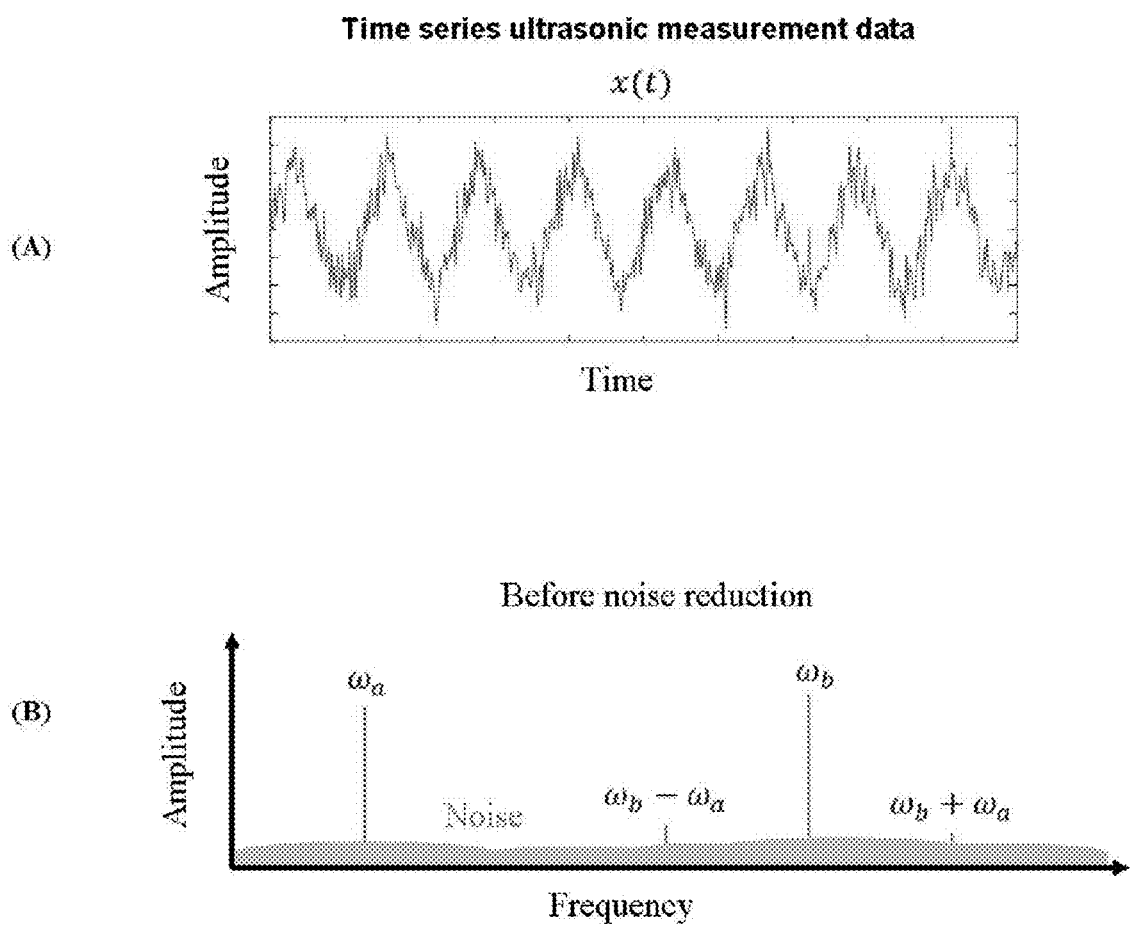
FIG. 5 illustrates (A) a time-series ultrasonic measurement signal and (B) a signal representing this signal in the frequency spectrum domain.

Referring to FIG. 4, it is possible to measure ultrasonic signals from the target structure 60 while exciting the structure 60 using excitation signals of low frequency LF $\omega_a$ and high frequency $\omega_b$ at the current time step (S10). The measured ultrasonic signal $x(t_m)$ is a signal in the time domain and has a length T ($0 \leq t_m \leq T$), which is a time interval of the current time step. FIG. 5 (A) illustrates time series ultrasonic data, and (B) illustrates a signal representing this signal in the frequency spectral domain. The ultrasonic measurement signal x(t) has $N_m$ data points. Here, in the ultrasonic measurement signal x(t), the frequency spectral density may include a vibration response component (i.e., an input frequency component) and a random noise component of the target structure 60, and may further include even a nonlinear modulation component caused by the fatigue crack since the target structure 60 has fatigue cracks.

For the ultrasonic signal measurement, as described above, the exciting unit 20 may transmit two excitation signals of low frequency LF($\omega_a$) and high frequency HF($\omega_b$) to the first and second excitation elements 42 and 44, respectively, attached to the target structure 60 to vibrate the target structure 60 simultaneously so that the target structure 60 is excited. At the same time, a response corresponding to the excitation may be measured using the vibration detection element 46 attached to the target structure 60, and the measurement signal $x(t_m)$ may be provided to the response signal processing unit 30. The measurement signal $x(t_m)$ may be an ultrasonic signal.

Figure 6:
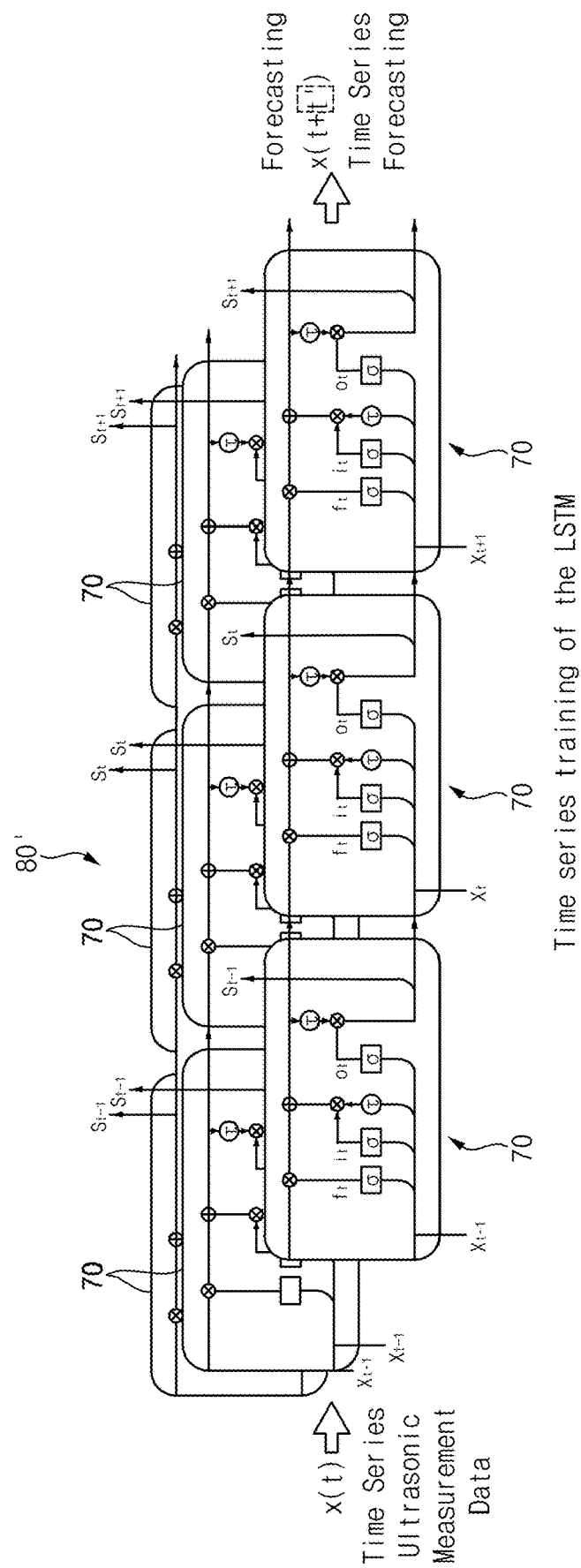
FIG. 6 shows training an LSTM network predictive model according to an exemplary embodiment of the present invention.

As a next step, a prediction model 80 may be built by constructing a LSTM network and training the LSTM network using the original ultrasonic signals $x(N_m f_s)$ to learn the basic pattern of the measured ultrasonic signal without random noise patterns (Step S20). The inputs and outputs of the LSTM network may be set to adjacent data points in time series data. That is, the LSTM network may be designed and trained to forecast the data of the next time step using the data of the current time step. FIG. 6 shows training of the LSTM network prediction model 80' in this way.

Specifically, in the response signal processing unit 30, the signal of the next time step of the measurement signal x(t.) of the current time step, that is, the signal x'($t_f$) up to time $T_f$ (where $T \leq t_f \leq T_f$) can be predicted based on a trained LSTM network model. To this end, as mentioned above, the trained LSTM network model can be built by learning a large amount of measurement signals in advance to predict the signal of the next time step when a measurement signal of the current time step is input.

Figure 7:
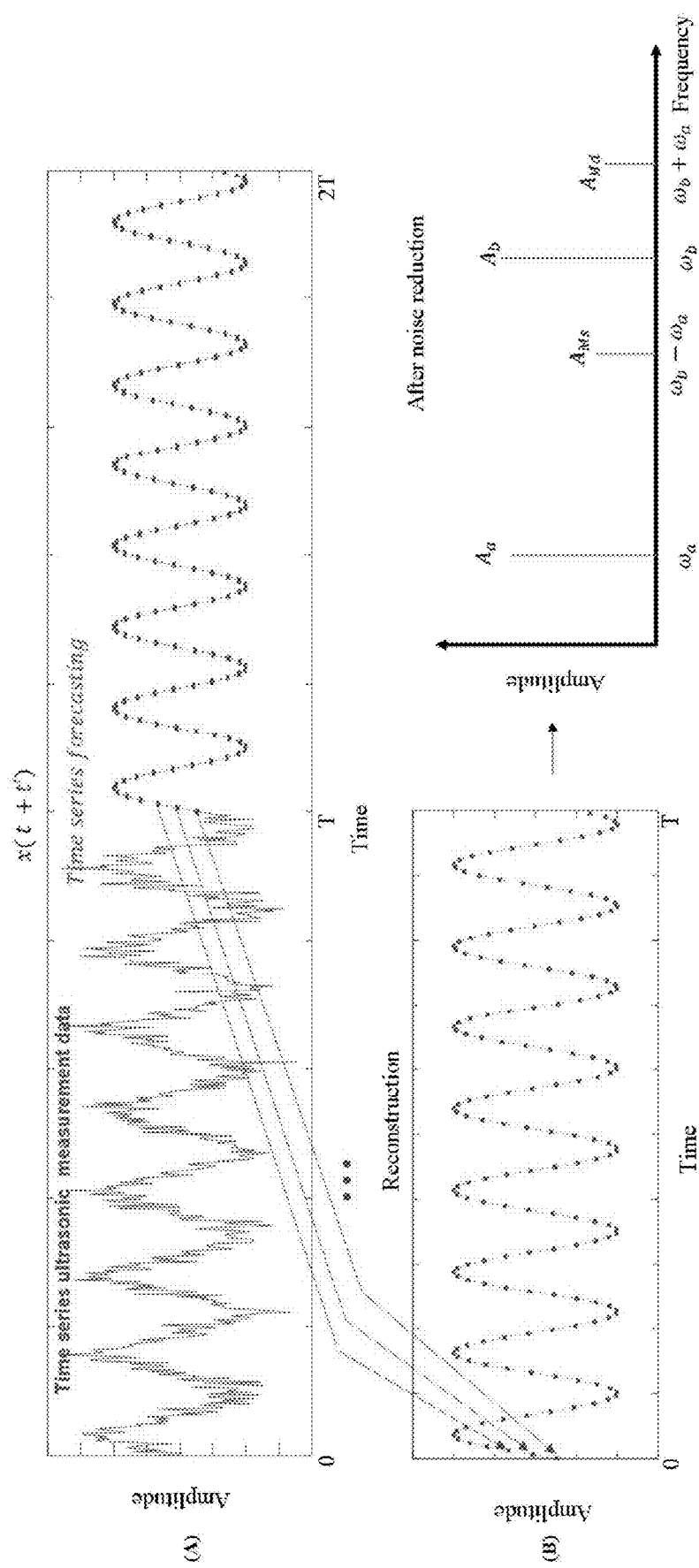
FIG. 7 schematically illustrates reconstructing an ultrasonic signal using a trained LSTM network according to an exemplary embodiment of the present invention.

A new time-series ultrasonic signal may be reconstructed by generating a prediction signal of the ultrasonic signal in the time domain using the trained LSTM network model. FIG. 7 schematically illustrates the reconstruction of an ultrasonic signal using a trained LSTM network according to an exemplary embodiment.

In an exemplary embodiment, as shown in FIG. 7(A), the ultrasonic measurement signal $x(t_m)$ of the current time step may be input into the trained LSTM network model 80' to generate a prediction signal $x'(t_f)$ of the next time step depending on the number of data points $N_f$. The number of data points $N_f$ may be preset to an optimal value, and the optimal value may be obtained through testing. Then, the following reconstructed ultrasonic signal $x_N(t)$ may be generated by combining the measurement signals $x(t_m)$ of the current time step and the predicted signals $x'(t_f)$ of the next time step (Step S30). Here, N is an indicator representing a reconstructed ultrasonic signal.

$$x_N(t)=x(t_m)+x'(t_f), 0 \leq t \leq T_f \quad (13\text{-}1)$$

Unlike the previous embodiment, in obtaining the reconstructed ultrasonic signal $x_N(t)$, as shown in FIG. 7(B), it may be possible to reconstruct the ultrasonic signal $x_N(t)$ using only the prediction signals $x'(t_f)$ without including the measurement signal $x(t_m)$.

$$x_N(t)=x'(t_f), T \leq t \leq T_f \quad (13\text{-}2)$$

In this case, the length of the reconstructed ultrasonic signal is as short as the length T of the measurement signal $x(t_m)$ compared to the previous embodiment. Since the measurement signal contains a lot of noise, the reconstructed signal obtained only from the predicted signal without noise components can be more effective in reducing noise than the reconstructed signal obtained by combining the measurement signal and predicted signals.

Next, the reconstructed ultrasonic signal $x_N(t)$ is Fourier-transformed and analyzed in the frequency spectrum domain to identify the nonlinear modulation frequency components caused by fatigue cracks (step S40). When the reconstructed ultrasonic signal $x_N(t)$ obtained as described above is analyzed in the frequency spectrum domain, the noise components may be effectively reduced in the frequency spectrum domain of the reconstructed ultrasonic signal $x_N(t)$, and thus only the components corresponding to the two input frequencies and the components corresponding to their modulation frequencies appear.

Specifically, the Fourier transform may be performed for the reconstructed signal $x_N(t)$ using Equation (9), and the spectral density function may be calculated (S40). The Fourier transform equation for the reconstructed signal $x_N(t)$ is given by Equation (14) below.

$$X_N(\omega)=\int_{-\infty}^{\infty} x_N(t)e^{-j\omega t}dt \quad (14)$$

As a result, spectral noise is reduced, and the noise-reduced spectral density function can be expressed by Equation (10) as follows.

$$P_{x_N}(\omega)=E[X_N^{+(\omega)}] \quad (15)$$

By substituting the spectral density function Equation (15) of the combined signal $x_N(t)$ into the nonlinear modulation parameter Equation (12), an equation of damage index $\beta_{DN}$ represented by Equation (16) can be obtained. The damage index $\beta_{DN}$ of the structure 60 can be calculated using Equation (16).

$$\beta_{D_N} \approx \frac{E[X_N(\omega_a+\omega_b)X_N^*(\omega_a+\omega_b)]+E[X_N(\omega_a-\omega_b)X_N^*(\omega_a-\omega_b)]}{E[X_N(\omega_a)X_N^*(\omega_a)]E[X_N(\omega_b)X_N^*(\omega_b)]} \quad (16)$$

The equation of damage index $\beta_{DN}$ obtained in this way may be used to detect fatigue cracks.

To evaluate the noise reduction performance of the spectral noise and data reduction technique according to the exemplary embodiment, the signal-to-noise ratio (SNR) may be calculated using the following equation.

$$SNR = 10 \log \frac{P_{x_N}(\omega_b - \omega_a) + P_{x_N}(\omega_b + \omega_a)}{\overline{P_{x_N}}(\omega_{noise})}(dBW) \quad (17)$$

Here, $P_{x_N}(\omega_b-\omega_a)$ and $P_{x_N}(\omega_b+\omega_a)$ represent the amplitudes of the frequency spectrum power density functions at the modulation frequencies $\omega_b \pm \omega_a$, respectively. In Equation (17), the denominator $\overline{P_{x_N}}(\omega_{noise})$ is the average noise floor (NF). The average NF is an average of the frequency spectrum power densities excluding the main components of the signals, such as the input components and nonlinear modulation components.

Finally, the effectiveness of data reduction may be evaluated by estimating the number of data points $N_f$ needed to achieve a modulation amplitude level equal to that of the original measurement signal. The number of data points $N_f$ can be obtained by the following equation.

$$N_f=aN_m \quad (18)$$

Here, a represents a data reduction rate, and its value may be determined in the range of 0 or more and 1 or less.

Meanwhile, when constructing the LSTM network 80' model, a single hidden layer LSTM network may be constructed to avoid the overfitting issue. Adaptive moment estimation (ADAM) optimizer may be used for LSTM network training. In terms of the hyper-parameters of the ADAM optimizer, the gradient decay and squared gradient decay factors may be set to, for example, 0.9 and 0.999, respectively. The epsilon value to prevent zero division and the initial learning rate may be set to $1.0e^{-8}$ and $1.5e^{-3}$, respectively. The learning rate drop factor may be set to 0.1 after half of the training epochs. The root mean square error (RMSE) function may be used as the cost function. The LSTM network construction, training, and testing may be performed in a MATLAB (R2019a) environment on a computer equipped with a processor (e. g., GPU) and RAM. For the training, 90% of the measured time-domain ultrasonic signals may be used as the training dataset, and the remaining 10% of measured data may be used as the validation dataset. As mentioned above, the spectral noise and data reduction algorithm may be implemented as a computer program, and may be stored on a computer-readable recording medium. In addition, the computer program recorded on such a recording medium may be executed by the computing device of the response signal processing unit 30.

The performance of the LSTM network-based spectral noise and data reduction technique according to the exemplary embodiment was experimentally verified. First and second piezoelectric (PZT) transducers (corresponding to the first and second excitation elements 42 and 44) for the ultrasonic signal excitation to an aluminum plate specimen and a third piezoelectric transducer (corresponding to vibration detection element 46) to detect the ultrasonic vibration were installed on the aluminum plate specimen. Fatigue loads of 28,000 times were applied to the aluminum plate specimen to create a fatigue crack with a length of 9 mm and a width of 20 μm.

Two waveform generators (corresponding to the exciting unit 20) were used to generate LF and HF sinusoidal ultrasonic input signals with unique frequencies ($\omega_a$=48 kHz and $\omega_b$=203 kHz), which were applied them to the first and second piezoelectric transducers for excitation. The duration and peak-to-peak amplitude were set at 0.1 sec and 12V, respectively. The aforementioned input frequencies were chosen in consideration of the local resonance characteristics of the specimen and the overlap of high-order harmonic components and nonlinear modulation components of the LF input. The corresponding ultrasonic responses detected through the third piezoelectric transducer were obtained by digitizing at a sampling rate of 1 MHz for 0.1 second using the digitizer. To improve the SNR of the ultrasonic response, the ultrasonic responses were averaged 5 times in the time domain.

Figure 8:
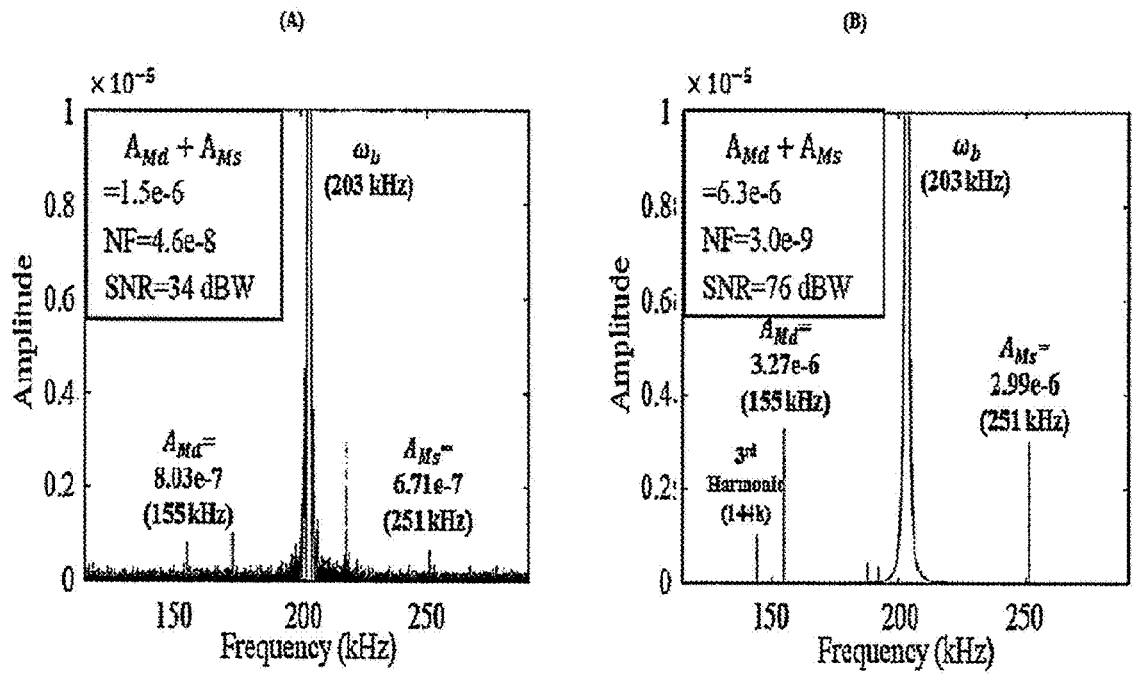
FIGS. 8 and 9 provide an example of comparing the spectral density functions $P_x(\omega)$ of measured signals before (A) and after (B) applying the spectrum noise and data reduction technique using the trained LSTM network to an aluminum specimen with 'fatigue cracks.'
Figure 9:
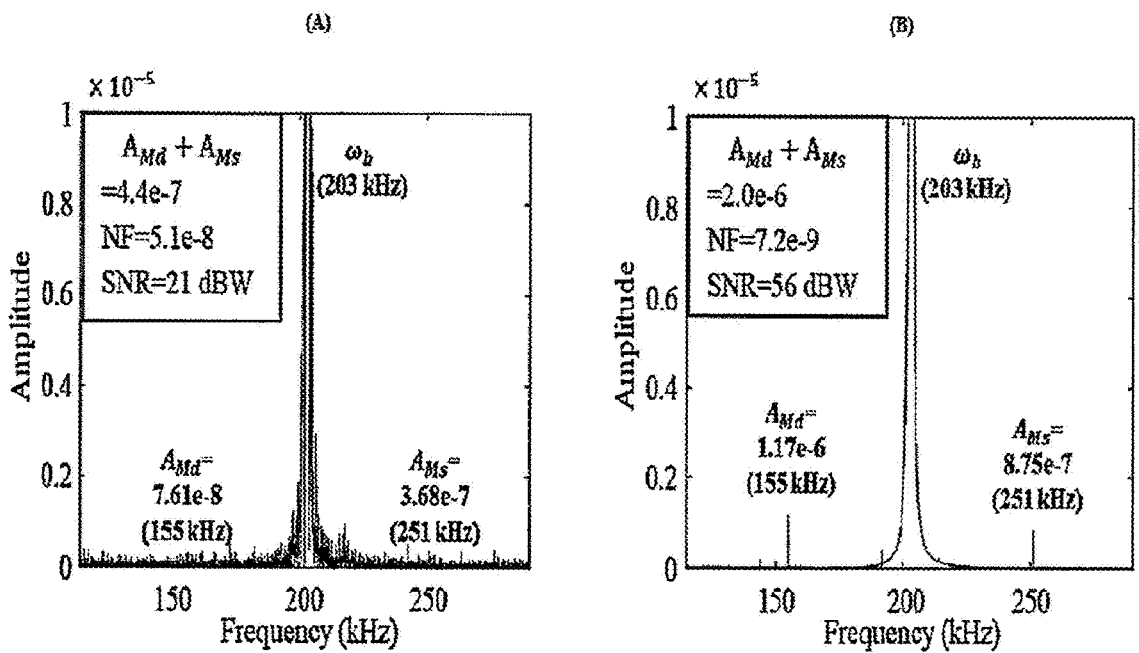

FIGS. 8 and 9 show the result of comparing the spectral density functions $P_x(\omega)$ of the measurement signals before (A) and after (B) of applying the spectral noise and data reduction method using the trained LSTM network according to an exemplary embodiment of the present invention to an aluminum plate specimen with 'fatigue cracks.' FIG. 8 is the case where $N_m$ is 100K ($N_f$ is set to 100K equal to $N_m$ for fair comparison), and the data acquisition duration T is 0.1 sec, and $f_s$ is set to 1 MHz. FIG. 9 is the case where $N_m$ is 30K ($N_f$ is also 30K), the data acquisition time T is set to 0.03 sec, $f_s$ is set to 1 MHz, and other test setting parameters are the same as those in FIG. 8. Hereinafter, the amplitudes $P_x(\omega_b+\omega_a)$ and $P_x(\omega_b-\omega_a)$ of the spectral density functions at modulation frequencies ($\omega_b+\omega_a$) and ($\omega_b-\omega_a$) are denoted by $A_{Ms}$ and $A_{Md}$.

FIG. 8 (A) shows that the values of nonlinear modulation frequency components $A_{Ms}$ and $A_{Md}$ are $6.71e^{-7}$ and $8.03e^{-7}$, respectively. FIG. 8 (B) shows the spectral density function $P_x(\omega)$ of the signal reconstructed by the trained LSTM network, and the estimated values of $A_{Ms}$ and $A_{Md}$ are $3.27e^{-6}$ and $2.99e^{-6}$, respectively. The amplitudes of the modulation frequency components in FIG. 8 (B) are significantly magnified compared to FIG. 8 (A), and the calculated NF values are $4.6e^{-8}$ and $3.0e^{-9}$, respectively, which are clearly reduced as shown in (A) and (B). In addition, the SNRs of $P_x(\omega)$ and $P_x(\omega)$ are 34 dBW and 76 dBW, respectively. Thus, the SNR is improved by 224%.

FIG. 9 (A) shows that the nonlinear modulation frequency components are not well distinguished from noises due to their high noise levels ($A_{Md}$+$A_{Ms}$=$4.4e^{-7}$ and SNR=21 dBW), so it is difficult to detect the nonlinear modulation frequency components. On the other hand, FIG. 9 (B) shows that the nonlinear modulation frequency components are clearly distinguished from the noises due to the improved SNR ($A_{Md}$+$A_{Ms}$=$2.0e^{-6}$ and SNR=56 dBW), and there is no difficulty in detecting them.

Figure 10:
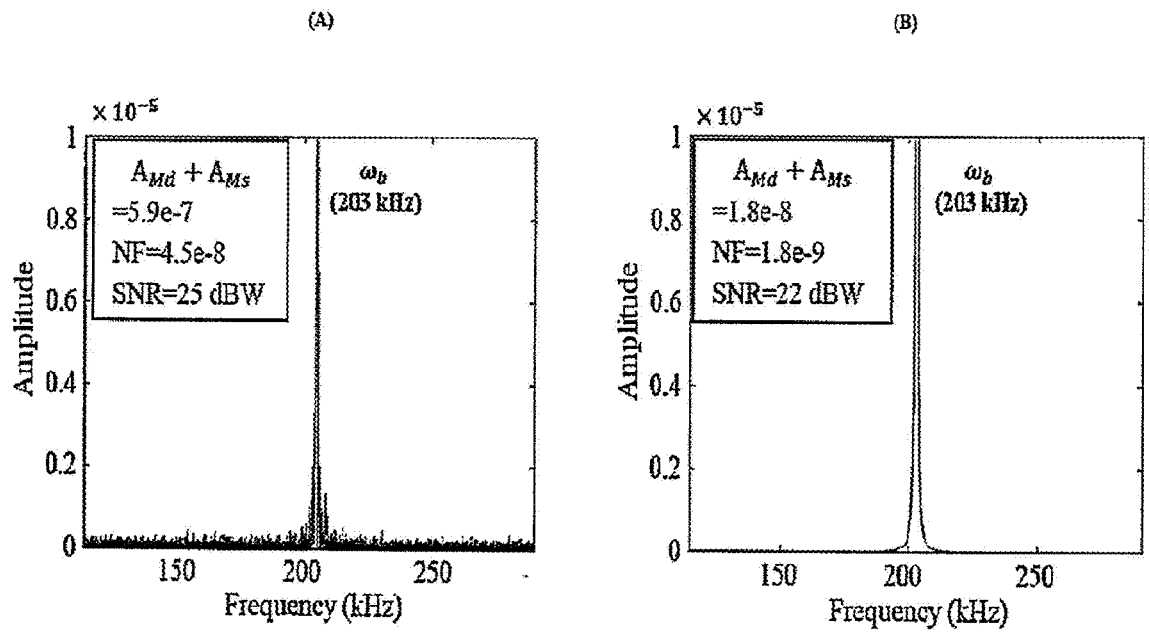
FIG. 10 provides an example of comparing the spectral density values before (A) and after (B) applying the LSTM network-based spectrum noise and data reduction method to an aluminum plate specimen 'without fatigue cracks.'

FIG. 10 illustrates the results of comparing the spectral density values before (A) and after (B) applying the LSTM network-based spectrum noise and data reduction method to an aluminum plate specimen without 'fatigue cracks' (data acquisition time T=0.1 sec, and $N_m$=$N_f$=100,000).

Referring to FIG. 10, the NF level decreases lower in figure (B) than in figure (A), but no frequency modulation component is observed in both figures. In other words, before applying the method according to the present invention, it is not easy to determine whether the modulation frequency components are included in the spectral density values due to the presence of a lot of noise components. However, after applying the method according to the present invention, it is possible clearly to confirm that there are no modulation frequency components in the spectral density values.

Summarizing the results shown in FIGS. 8-10, it can be seen that the LSTM network 80' model built according to the exemplary method of the present invention greatly reduces the noise components included in the spectral density value of the reconstructed ultrasonic signal, while enhancing the nonlinear frequency modulation components, thereby improving the SNR and enabling clear detection of modulation frequency components appearing on both sides of the input high-frequency components.

Figure 11:
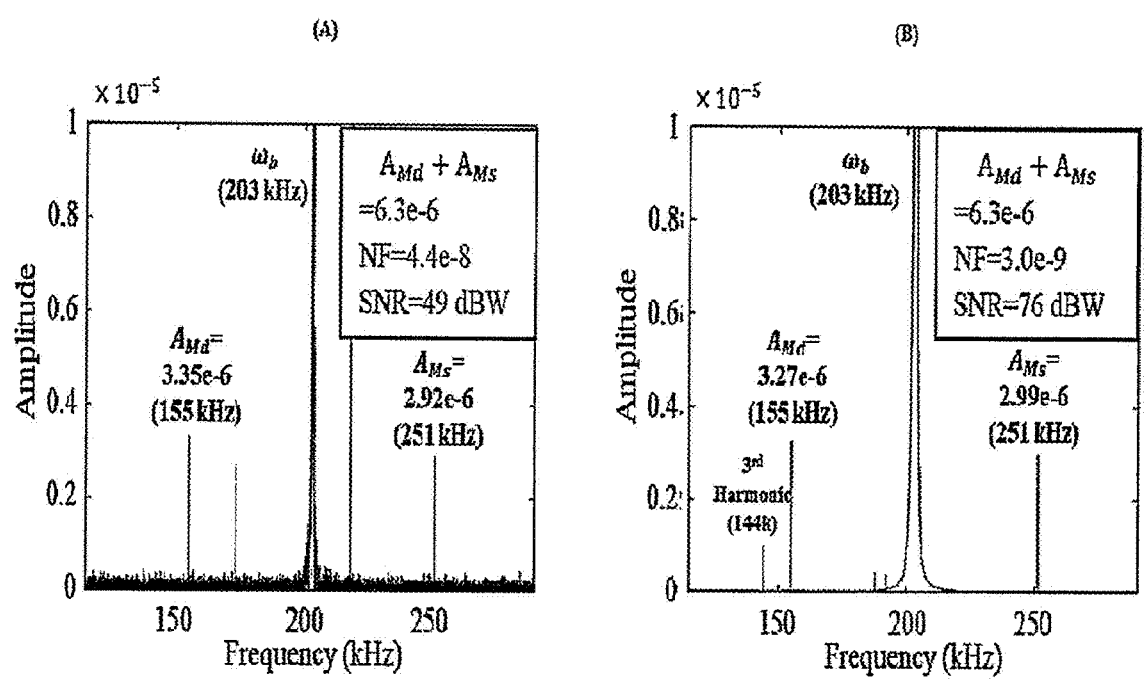
FIGS. 11 and 12 demonstrate the data reduction effects obtained when applying the trained LSTM network-based spectrum noise and data reduction method according to an exemplary embodiment of the present invention to an aluminum plate specimen with fatigue cracks.
Figure 12:
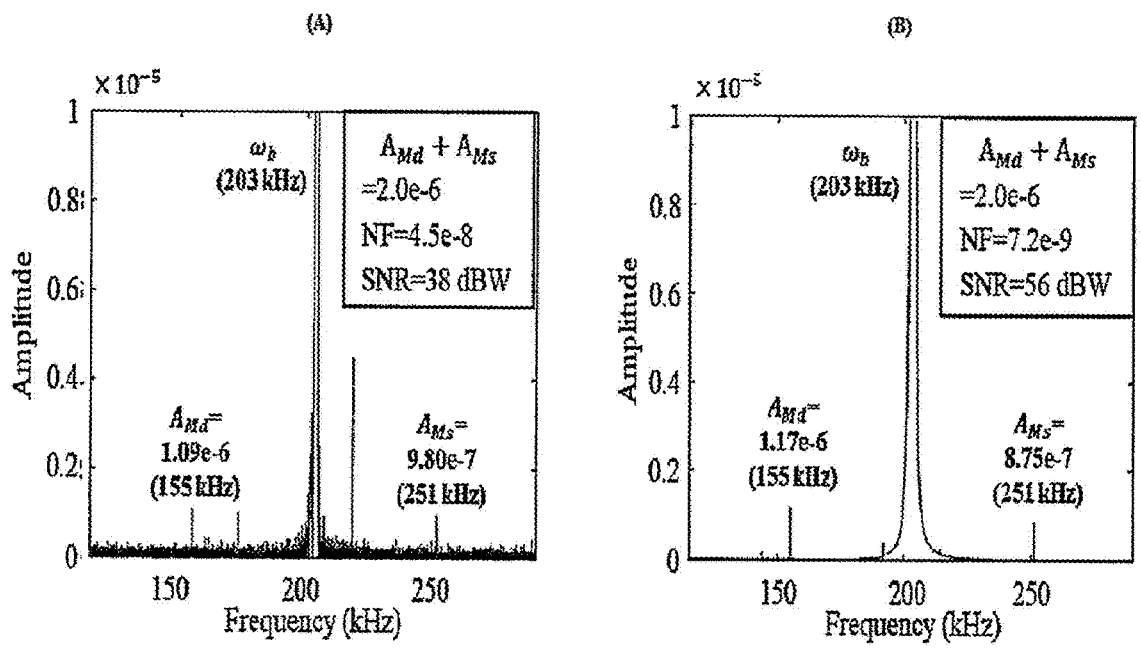

Meanwhile, FIGS. 11 and 12 show data reduction effects obtained when applying the trained LSTM network-based spectrum noise and data reduction method according to an exemplary embodiment of the present invention to an aluminum plate specimen with fatigue cracks.

Referring to FIG. 11, the magnitude of the nonlinear modulation frequency component $A_{Ms}$+$A_{Md}$ obtained from the 'measured ultrasonic signal' with 480 k data points is $6.3e^{-6}$ (see Figure (A)). It is shown that from the 'reconstructed ultrasonic signal' obtained using the trained LSTM network 80', the same level of the nonlinear modulation frequency component $A_{Ms}$+$A_{Md}$ value can be obtained even with only 100,000 data points (a=0.21). The estimated SNRs of the measured ultrasonic signal and the reconstructed ultrasonic signal are 49 dBW and 76 dBW, respectively.

FIG. 12 shows the results of performing tests similar to FIG. 11 using 'measured ultrasonic signals' with 145,000 data points. The magnitude of the nonlinear modulation frequency component $A_{Ms}$+$A_{Md}$ obtained from the 'measured ultrasonic signal' with 145,000 data points is $2.0e^{-6}$. Even if the number of data points is reduced to 30,000 (a=0.21), the same level of value $2.0e^{-6}$ of nonlinear modulation frequency components $A_{Ms}$+$A_{Md}$ can be obtained by using the 'reconstructed ultrasonic signal' obtained using the trained LSTM network 80'. The estimated SNRs of the measured ultrasonic signal and the reconstructed ultrasonic signal are 38 dBW and 56 dBW, respectively.

The test results shown in FIGS. 11 and 12 demonstrate that the method according to exemplary embodiments of the present invention can achieve similar frequency modulation amplitudes with reduced data points and noise.

Figure 13:
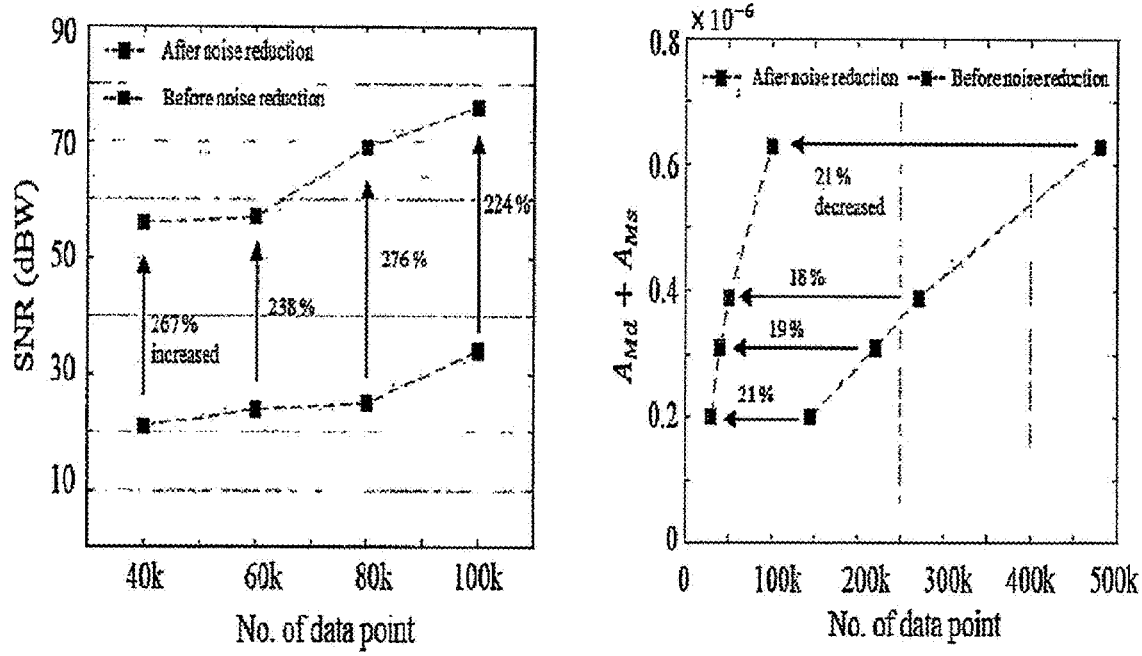
FIG. 13 shows results of performance evaluation of the trained LSTM network-based spectrum noise and data reduction method according to an exemplary embodiment of the present invention using an aluminum plate specimen.

FIG. 13 shows results of performance evaluation of the trained LSTM network-based spectrum noise and data reduction method according to an exemplary embodiment of the present invention using an aluminum plate specimen. Figure (A) shows the spectral noise reduction performance, with SNR improving by 238% and 276% for 60 k and 80 k data points, respectively. Figure (B) shows the data reduction performance, with data reduction rates a of 0.18 and 0.19 for 220 k and 270 k data points, respectively.

As described above, according to the exemplary embodiments of the present invention, the performance of fatigue crack detection can be greatly improved by significantly reducing the spectral noise using the spectral noise and data reduction method using the trained LSTM network. This is because the reconstructed signal from the trained LSTM can reduce the noise component (SNR can be increased up to 276%) while maintaining and amplifying the nonlinear modulation component necessary for fatigue crack detection. In addition, the trained LSTM network can generate a reconstructed signal using significantly fewer data points than the measured signal without reducing the modulation amplitude, thereby reducing the amount of data that needs to be processed (reconstructed signal can be generated using only 20% of the original data).

INDUSTRIAL APPLICABILITY

The present invention can be utilized to detect cracks occurring in physical structures, structural bodies, and the like.

As described above, although the embodiments have been described with limited drawings, it may be understood that those skilled in the art can variously modify and change the present invention without departing from the spirit and scope of the present invention described in the claims below. For example, even if the described techniques may be performed in an order different from the method described, and/or components of the described system, structure, apparatus, circuit, etc. are combined or assembled in a different form than described or substituted or replaced by other elements or equivalents, appropriate results can still be achieved. Therefore, other implementations, other embodiments, and equivalents with the claims fall within the scope of claims.

What is claimed is:

1. A method for detecting a fatigue crack in a structure, comprising:
  training an LSTM network using ultrasonic measurement signals measured from structures simultaneously excited by two ultrasonic signals with two distinguishable frequencies, respectively, to acquire a prediction model for time-domain signals, in a response signal processing unit;
  inputting a ultrasonic measurement signal at a current time step measured from a target structure that is simultaneously excited by a first ultrasonic signal of a first frequency $\omega_a$ and a second ultrasonic signal of a second frequency $\omega_b$, wherein $\omega_a < \omega_b$, into a trained LSTM network to obtain an ultrasonic prediction signal at a next time step, depending on a number of data points set, in the response signal processing unit;
  reconstructing a signal using the obtained ultrasonic prediction signal, in the response signal processing unit;
  Fourier transforming the reconstructed signal, in the response signal processing unit; and
  determining whether a crack has occurred in the target structure by detecting a nonlinear modulation component based on a value of a spectrum density function obtained using the Fourier transformed signal, in the response signal processing unit.

2. The method of claim 1, further comprising, in the response signal processing unit, calculating a damage index by substituting the spectral density function into a nonlinear modulation parameter equation; and detecting a fatigue crack of the structure using the calculated damage index.

3. The method of claim 2, wherein the spectrum density function $P_{x_N}(\omega)$ is calculated using equation $P_{x_N}(\omega) = E[X_N(\omega)X_N^*(\omega)]$, where $X_N(\omega)$ represents the Fourier transformed signal of the reconstructed ultrasonic signal $x_N(t)$, * denotes a complex conjugate, and E[ ] represents an expectation operator.

4. The method of claim 3, wherein the damage index $\beta_{D_N}$ is calculated using an equation of $$\beta_{D_N} \approx \frac{E[X_N(\omega_a+\omega_b)X_N^*(\omega_a+\omega_b)] + E[X_N(\omega_a-\omega_b)X_N^*(\omega_a-\omega_b)]}{E[X_N(\omega_a)X_N^*(\omega_a)]E[X_N(\omega_b)X_N^*(\omega_b)]}.$$

5. The method of claim 1, further comprising: simultaneously exciting the target structure by generating the first and second ultrasonic signals by an exciting unit and applying them to first and second excitation elements attached to the target structure, respectively; and detecting vibration of the target structure according to excitation of the first and second ultrasonic signals with a vibration detection element attached to the target structure, and providing a corresponding ultrasonic measurement signal to the response signal processing unit.

6. The method of claim 1, wherein the prediction model of the trained LSTM network is designed and trained to predict an ultrasonic signal at the next time step by learning the nonlinear modulation frequency components, which are fatigue crack-induced patterns over the entire time series data of the ultrasonic measurement signal, in a way of updating a previous cell state to a new cell state by partially adding new information provided by an input gate while forgetting some of the previous cell state information.

7. The method of claim 1, wherein the reconstructed signal is a signal reconstructed with only ultrasonic prediction signals at the next time step.

8. The method of claim 7, wherein the number of data points of the reconstructed signal is determined by multiplying the number of data points of the ultrasonic measurement signal by a data reduction rate $\alpha$ of a predetermined size, and the data reduction rate $\alpha$ is determined within a range from 0 and 1.

9. The method of claim 1, wherein the reconstructed signal is a signal reconstructed by combining the ultrasonic measurement signal at the current time step and the ultrasonic prediction signal at the next time step.

10. The method of claim 1, wherein the Fourier transformed signal of the reconstructed signal is a signal in a frequency domain in which noise is reduced and information of the ultrasonic measurement signal is enhanced.

11. A system for detecting fatigue cracks in a structure, comprising:
  a first excitation element attached to a first region of a target structure and configured to excite the target structure by being vibrated when a first ultrasonic signal of a first frequency $\omega_a$ is input;
  a second excitation element attached to the first region of the target structure and configured to excite the target structure by being vibrated as a second ultrasonic signal of a second frequency $\omega_b$ is input, where $\omega_a < \omega_b$;
  an exciting unit configured to generate the first ultrasonic signal and the second ultrasonic signal and simultaneously provide them to the first and second excitation elements, respectively;
  a vibration detection element attached to a second region of the target structure spaced apart from the first region, and configured to detect vibration of the target structure according to excitation by the first and second ultrasonic signals to generate a corresponding ultrasonic measurement signal; and
  a response signal processing unit including an operation processing unit configured to perform the functions of: training an LSTM network using ultrasonic measurement signals measured from structures simultaneously excited by two ultrasonic signals with two distinguishable frequencies, respectively, to acquire a prediction model for time-domain signals; inputting an ultrasonic measurement signal at a current time step measured from a target structure that simultaneously excited by a first ultrasonic signal of a first frequency $\omega_a$ and a second ultrasonic signal of a second frequency $\omega_b$, wherein $\omega_a < \omega_b$, into a trained LSTM network to obtain an ultrasonic prediction signal at a next time step, depending on a number of data points set; reconstructing a signal using the obtained ultrasonic prediction signal; Fourier transforming the reconstructed signal in the response signal processing unit; and determining whether a crack has occurred in the target structure by detecting a nonlinear modulation component based on a value of a spectrum density function obtained using the Fourier transformed signal.

12. The system of claim 11, wherein the operation processing unit of the response signal processing unit further is configured to further perform the functions of calculating a damage index by substituting the spectral density function into a nonlinear modulation parameter equation; and detecting the fatigue crack of the structure using the calculated damage index.

13. The system of claim 11, wherein the response signal processing unit further includes a digitizing unit that converts an analog measurement signal measured by the vibration detection element into a digital measurement signal and provides the converted digital measurement signal to the operation processing unit.

14. The system of claim 11, wherein the first and second excitation elements and the vibration detection element are comprised of piezoelectric elements.

15. The system of claim 11, wherein the prediction model of the trained LSTM network is designed and trained to predict an ultrasonic signal at the next time step by learning the nonlinear modulation frequency components, which are fatigue crack-induced patterns over the entire time series data of the ultrasonic measurement signal, in a way of updating a previous cell state to a new cell state by partially adding new information provided by an input gate while forgetting some of the previous cell state information.

16. The system of claim 11, wherein the reconstructed signal is a signal reconstructed with only ultrasonic prediction signals at the next time step.

17. The system of claim 16, wherein the number of data points of the reconstructed signal is determined by multiplying the number of data points of the ultrasonic measurement signal by a data reduction rate $\alpha$ of a predetermined size, and the data reduction rate $\alpha$ is determined within a range from 0 and 1.

18. The system of claim 11, wherein the reconstructed signal is a signal reconstructed by combining the ultrasonic measurement signal at the current time step and the ultrasonic prediction signal at the next time step.

19. A computer-readable storage medium in which a computer program is stored, the computer program being configured to, when executed by a processor of a computer device, cause the processor of the computer device to calculate information on whether a crack occur in a target structure by processing an ultrasonic measurement signal generated by detecting vibrations caused by ultrasonic excitation of the target structure and provided as an input, wherein the computer program comprises the functions of: training an LSTM network using ultrasonic measurement signals measured from structures simultaneously excited by two ultrasonic signals with two distinguishable frequencies, respectively, to acquire a prediction model for time-domain signals; inputting an ultrasonic measurement signal at a current time step measured from a target structure that simultaneously excited by a first ultrasonic signal of a first frequency w a and a second ultrasonic signal of a second frequency $\omega_b$, wherein $\omega_a<\omega_b$, into a trained LSTM network to obtain an ultrasonic prediction signal at a next time step, depending on a number of data points set; reconstructing a signal using the obtained ultrasonic prediction signal; Fourier transforming the reconstructed signal in the response signal processing unit; and determining whether a crack has occurred in the target structure by detecting a nonlinear modulation component based on a value of a spectrum density function obtained using the Fourier transformed signal.

20. A computer-executable program stored in a computer-readable storage medium to calculate information on whether a crack occur in a target structure by processing an ultrasonic measurement signal generated by detecting vibrations caused by ultrasonic excitation of the target structure and provided as an input, wherein the computer program comprises the functions of: training an LSTM network using ultrasonic measurement signals measured from structures simultaneously excited by two ultrasonic signals with two distinguishable frequencies, respectively, to acquire a prediction model for time-domain signals; inputting an ultrasonic measurement signal at a current time step measured from a target structure that simultaneously excited by a first ultrasonic signal of a first frequency $\omega_a$ and a second ultrasonic signal of a second frequency $\omega_b$, wherein $\omega_a<\omega_b$, into a trained LSTM network to obtain an ultrasonic prediction signal at a next time step, depending on a number of data points set; reconstructing a signal using the obtained ultrasonic prediction signal; Fourier transforming the reconstructed signal in the response signal processing unit; and determining whether a crack has occurred in the target structure by detecting a nonlinear modulation component based on a value of a spectrum density function obtained using the Fourier transformed signal.

* * * * *